US012132300B2

(12) United States Patent
Sumida et al.

(10) Patent No.: US 12,132,300 B2
(45) Date of Patent: Oct. 29, 2024

(54) WIRING MEMBER

(71) Applicant: Sumitomo Wiring Systems, Ltd., Mie (JP)

(72) Inventors: Shintaro Sumida, Mie (JP); Motohiro Yokoi, Mie (JP); Kenta Ito, Mie (JP); Tetsuya Nishimura, Mie (JP); Ryusuke Kudo, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 207 days.

(21) Appl. No.: 17/612,064

(22) PCT Filed: May 15, 2020

(86) PCT No.: PCT/JP2020/019410
§ 371 (c)(1),
(2) Date: Nov. 17, 2021

(87) PCT Pub. No.: WO2020/241302
PCT Pub. Date: Dec. 3, 2020

(65) Prior Publication Data
US 2022/0209517 A1 Jun. 30, 2022

(30) Foreign Application Priority Data
May 31, 2019 (JP) .................................. 2019-102423

(51) Int. Cl.
*B60R 16/02* (2006.01)
*H01B 7/08* (2006.01)
*H02G 3/04* (2006.01)

(52) U.S. Cl.
CPC ......... *H02G 3/0456* (2013.01); *H01B 7/0846* (2013.01); *B60R 16/0207* (2013.01); *B60R 16/0215* (2013.01)

(58) Field of Classification Search
CPC ....... B60R 6/0207; B60R 6/0215; H01B 7/08; H01B 7/0823; H01B 7/0838
(Continued)

(56) References Cited

U.S. PATENT DOCUMENTS

| 5,281,765 | A | * | 1/1994 | Lura | .................... | H01B 7/0838 |
| | | | | | | 174/71 R |
| 6,438,301 | B1 | * | 8/2002 | Johnson | ................. | H01B 11/12 |
| | | | | | | 174/117 FF |

(Continued)

FOREIGN PATENT DOCUMENTS

| CN | 109155475 | 1/2019 |
| JP | 8-171817 | 7/1996 |

(Continued)

OTHER PUBLICATIONS

International Search Report issued in International Pat. Appl. No. PCT/JP2020/019410, dated Jun. 16, 2020, along with an English translation thereof.

(Continued)

*Primary Examiner* — Paresh Paghadal
(74) *Attorney, Agent, or Firm* — Greenblum & Bernstein, P.L.C.

(57) ABSTRACT

A wiring member includes: at least one wire-like transmission member; and a base member keeping the wire-like transmission member in a flat form, wherein the base member includes a connection end portion, the wire-like transmission member is held by the connection end portion to be directed to a tip end portion of the connection end portion along an extension direction of the connection end portion, and the tip end portion of the connection end portion includes a catch suppressing shape portion directed to a base end side of the connection end portion with an increasing distance from the wire-like transmission member.

5 Claims, 6 Drawing Sheets

(58) Field of Classification Search
USPC .............................. 174/117 F, 117 FF, 72 A
See application file for complete search history.

(56) References Cited

U.S. PATENT DOCUMENTS

| | | | |
|---|---|---|---|
| 10,756,463 | B2 | 8/2020 | Hiroki et al. |
| 10,867,721 | B2 | 12/2020 | Ishida et al. |
| 2019/0165502 | A1 | 5/2019 | Hiroki et al. |
| 2020/0091668 | A1* | 3/2020 | Iwadare ................. H01R 24/20 |

FOREIGN PATENT DOCUMENTS

| | | | | | |
|---|---|---|---|---|---|
| JP | 8-315641 | | 11/1996 | | |
| JP | 2H11297388 | A * | 2/1998 | ............... | H01R 4/70 |
| JP | 2001-216846 | | 8/2001 | | |
| JP | 2001256846 | A * | 9/2001 | ............... | H01B 7/08 |
| JP | 2002056722 | A * | 2/2002 | ............... | B16R 16/02 |
| JP | 2003-208821 | | 7/2003 | | |
| JP | 2005-78811 | | 3/2005 | | |
| JP | 2008300527 | A * | 12/2008 | ............... | H05K 1/02 |
| JP | 2011-40264 | | 2/2011 | | |
| JP | 2014186807 | A * | 3/2013 | ............... | B60R 16/02 |
| JP | 2015-97151 | | 5/2015 | | |
| JP | 2015-138750 | | 7/2015 | | |
| JP | 2018-137208 | | 8/2018 | | |

OTHER PUBLICATIONS

International Preliminary Report on Patentability issued in International Pat. Appl. No. PCT/JP2020/019410, dated Dec. 9, 2021, along with an English translation thereof.

Office Action Issued in Corresponding JP Patent Application No. 2019-102423, dated May 10, 2022, along with an English translation thereof.

Office Action Issued in Corresponding JP Patent Application No. 2019-102423, dated Oct. 18, 2022, along with an English translation thereof.

Office Action issued in Corresponding Chinese Patent Application No. 202080039620.X, dated Nov. 17, 2022, along with an English translation thereof.

Office Action issued in Corresponding JP Patent Application No. 2023-005620, dated Jan. 9, 2024, along with an English translation thereof.

Office Action issued in Corresponding JP Patent Application No. 2023-005620, dated Aug. 29, 2023, along with an English translation thereof.

* cited by examiner

WIRING MEMBER

TECHNICAL FIELD

The present disclosure relates to a wiring member.

BACKGROUND ART

Patent Document 1 discloses a wire harness in which an electrical wire is welded to a functional exterior member formed into a sheet-like shape.

PRIOR ART DOCUMENTS

Patent Documents

Patent Document 1: Japanese Patent Application Laid-Open No. 2018-137208

SUMMARY

Problem to be Solved by the Invention

It is desired that a wiring member is hardly caught by a surrounding member in handling the wiring member.

Accordingly, an object of the present disclosure is to make a wiring member be hardly caught by a surrounding member.

Means to Solve the Problem

A wiring member according to the present disclosure is a wiring member including: at least one wire-like transmission member; and a base member keeping the wire-like transmission member in a flat form, wherein the base member includes a connection end portion, the wire-like transmission member is held by the connection end portion to be directed to a tip end portion of the connection end portion along an extension direction of the connection end portion, and the tip end portion of the connection end portion includes a catch suppressing shape portion directed to a base end side of the connection end portion with an increasing distance from the wire-like transmission member.

Effects of the Invention

According to the present disclosure, the wiring member is hardly caught by a surrounding member.

DESCRIPTION OF EMBODIMENT(S)

Description of Embodiment of Present Disclosure

Figure 1:
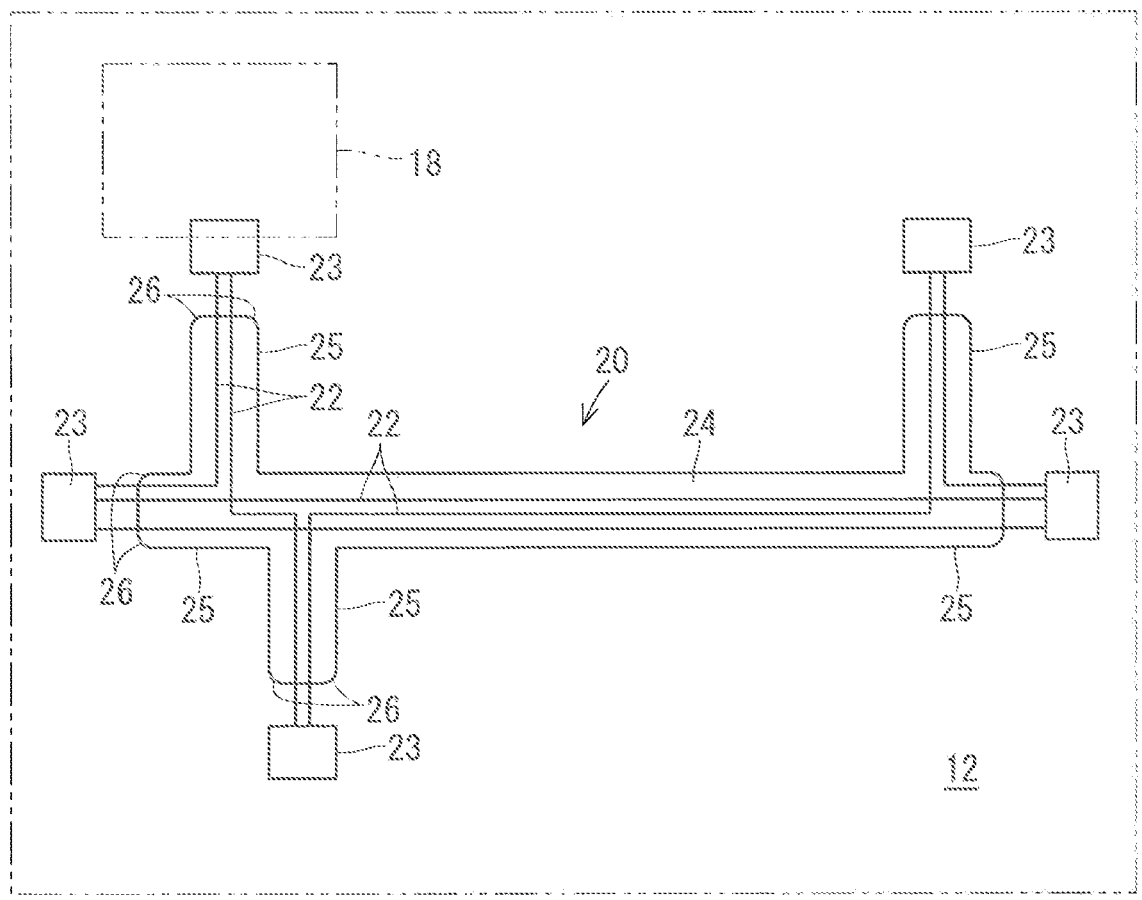
FIG. 1 is a schematic plan view illustrating a wiring member.

Embodiments of the present disclosure are listed and described firstly.

A wiring member according to the present disclosure is as follows.

(1) A wiring member includes: at least one wire-like transmission member; and a base member keeping the wire-like transmission member in a flat form, wherein the base member includes a connection end portion, the wire-like transmission member is held by the connection end portion to be directed to a tip end portion of the connection end portion along an extension direction of the connection end portion, and the tip end portion of the connection end portion includes a catch suppressing shape portion directed to a base end side of the connection end portion with an increasing distance from the wire-like transmission member. The tip end portion of the connection end portion includes the catch suppressing shape portion directed to the base end side of the connection end portion with the increasing distance from the wire-like transmission member. Thus, even when the connection end portion moves toward the other apparatus when the end portion of the wire-like transmission member is connected to the other apparatus, for example, the tip end portion of the connection end portion is hardly caught by a surrounding member.

(2) The catch suppressing shape portion may have a curved surface shape convexed to an outer side. The tip end portion of the connection end portion is hardly caught by the surrounding member.

(3) The wire-like transmission member may be connected to a connector at the tip end portion of the connection end portion. When the connector is moved to be connected to an apparatus, the tip end portion of the connection end portion is hardly caught by the surrounding member. In such a case, a catch suppressing shape portion may be formed in the tip end portion of the connection end portion.

(4) A width of the connector may be smaller than a maximum width of the connection end portion. When the width of the connector is smaller than a maximum width of the connection end portion, the connection end portion protrudes to an outer lateral side of the connector. In such a case, it is efficiently suppressed that the connection end portion is caught by the surrounding member.

(5) The catch suppressing shape portion may be formed into a shape directed to the base end side of the connection end portion with an increasing distance from the wire-like transmission member from a position of a side edge portion of the connector or a position on an inner side of the side edge portion as an origin in a width direction of the connector. The catch suppressing shape portion is formed in the side edge portion of the connector or on the inner side of the side edge portion as the origin, thus the connection end portion is hardly caught by the surrounding member.

(6) The connector may be a multiple stage connector. A width of the multiple stage connector is relatively made small easily. Thus, the connection end portion protrudes to an outer lateral side of the multiple stage connector easily. In such a case, it is efficiently suppressed that the connection end portion is caught by the surrounding member.

(7) The plurality of wire-like transmission members extending from the multiple stage connector may be held by the connection end portion in a parallel state. In this case, the connection end portion has a large width easily. Thus, the connection end portion protrudes to an outer lateral side of the multiple stage connector easily. In such a case, it is efficiently suppressed that the connection end portion is caught by the surrounding member.

Details of Embodiment of Present Disclosure

Specific examples of a wiring member of the present disclosure are described hereinafter with reference to the drawings. The present disclosure is not limited to these examples, but is indicated by claims, and it is intended that meanings equivalent to claims and all modifications within a scope of claims are included.

Embodiment

Figure 2:
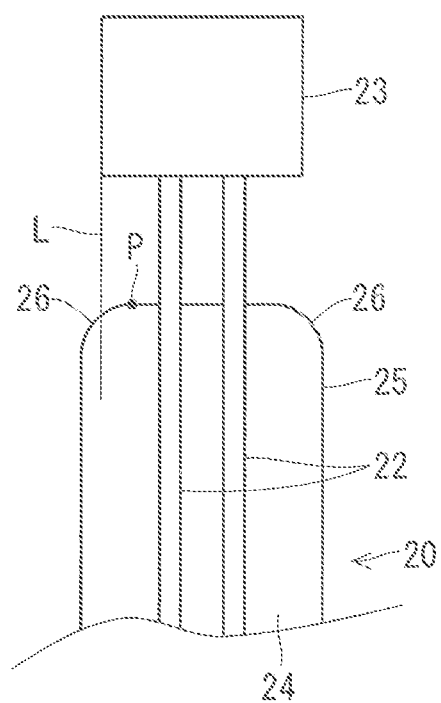
FIG. 2 is a partially-enlarged schematic plan view of the wiring member.

A wiring member according to an embodiment is described hereinafter. FIG. 1 is a schematic plan view illustrating a wiring member 20. FIG. 2 is a partially-enlarged schematic plan view of the wiring member 20.

The wiring member 20 is a wiring member used for a vehicle. The wiring member 20 is disposed on a plate-like portion 12 in the vehicle, for example. The plate-like portion 12 is assumed to be a part of a metal body or a part of an interior panel in the vehicle, for example. At least one main surface of the plate-like portion 12 may have a flat surface shape The part of the metal body or interior panel may have a convex-concave shape in which a groove or a protrusion is formed.

The wiring member 20 includes an electrical wire 22 and a sheet material 24.

The electrical wire 22 is an example of a wire-like transmission member. More specifically, the electrical wire 22 includes a core wire and a covering. The core wire is a wire-like conductor formed by a metal conductive member, for example. The covering is an insulating part covering around the core wire. It is sufficient that the wire-like transmission member is a wire-like member transmitting an electrical power or light, for example. For example, the wire-like transmission member may be a bare conductive wire, a shielded wire, a twisted wire, an enamel wire, a nichrome wire, or an optical fiber in addition to the electrical wire. Herein, the wiring member includes a plurality of wire-like transmission members (electrical wires 22).

The sheet material 24 is a member to which the electrical wires 22 are fixed. The plurality of electrical wires 22 are fixed to the sheet material 24, thereby being kept in a flat form along a predetermined route. Thus, the sheet material 24 is an example of a base member keeping the electrical wires 22 in a flat form.

Herein, the plurality of electrical wires 22 are fixed on a side of one main surface of the sheet material 24. A material constituting the sheet material 24 is not particularly limited. The sheet material 24 is formed of a material containing resin such as polyvinyl chloride (PVC), polyethylene terephthalate (PET), polypropylene (PP), and nylon, for example. The sheet material 24 may be a fibrous material having fiber such as a non-woven cloth, a woven fabric, or a knitting fabric or a non-fiber material, for example. The fibrous material is a member in which minute spaces are formed between fibers. The non-fiber material may be a solid member with an inner portion evenly filled or a foam made up by foam molded resin. The sheet material 24 may contain a material such as metal, for example.

A fixing state of the electrical wire 22 and the sheet material 24 is not particularly limited, however, bonding or welding may also be applied. The bonding indicates that two members are bonded to each other via an inclusion such as an adhesive agent or a double-sided adhesive tape. The welding indicates that resin contained in at least one of two members are melted and the two members are welded to each other without an intervention of an inclusion. Herein, at least one of resin contained in the covering of the electrical wire 22 and resin contained in the sheet material 24 is melted and bonded to the other side member, thus the electrical wire 22 and the sheet material 24 are fixed to each other. The welding in this case is performed by ultrasonic welding, for example.

The sheet material 24 may be made up of a single layer or a plurality of stacked layers. When the first sheet material 24 is made up of the plurality of stacked layers, it is considered that a resin layer and a resin layer are stacked, for example. It is also considered that a resin layer and a metal layer are stacked, for example. The sheet material 24 may be made up of a non-fiber material layer and a non-fiber material layer overlapped with each other, a non-fiber material layer and a fiber material layer overlapped with each other, or a fiber material layer and a fiber material layer overlapped with each other.

The other sheet material may overlap with the sheet material 24 to cover the electrical wire 22. The other sheet material in this case may be considered a cover sheet covering the electrical wire 22. A material of the cover sheet is not particularly limited. The cover sheet is formed of a material containing resin such as PVC, PET, PP, and nylon, for example. The cover sheet may be a fiber material, a non-fiber material, or a metal material. The cover sheet may be made up of a single layer or a plurality of stacked layers. The cover sheet is fixed to the sheet material 24 in both side portions of the sheet material 24, for example. A fixing state of the sheet material 24 and the cover sheet is not particularly limited, however, welding or bonding is also applicable. The cover sheet may be partially provided on the sheet material. When the cover sheet has rigidity higher than the sheet material 24, the wiring member 20 can be kept in a predetermined form easily.

The wiring member 20 may be branched in accordance with a position of each electrical component to which the wiring member 20 is connected. Illustrated herein is an example that the plurality of electrical wires 22 are branched at a plurality of positions (three positions herein). In this case, the sheet material 24 may be formed to be branched along a branch route of the electrical wire 22. A portion of the wiring member 20 where a largest number of electrical wires 22 are provided may be referred to as a main wire part. A portion where the electrical wires 22 are branched from the main wire part may be referred to as a branch wire part.

A connector 23 is attached to end portions of the plurality of electrical wires 22. Herein, the electrical wire 22 extends from an end portion of the sheet material 24 in both end portions of the main wire part and an end portion of the branch wire part. A terminal is attached to the end portion of the electrical wire 22 extending from the end portion of the sheet material 24, and the terminal is inserted into a cavity of the connector 23. The connectors may be fixed to the end portion of the sheet. In this case, the electrical wire 22 may not extend from the end portion of the sheet material 24. The wiring member 20 is connected to the other electrical apparatus 18 via the connector 23, for example (one electrical apparatus 18 is exemplified in FIG. 1).

The example of the wiring member 20 is not limited to the above example. The wiring member may be kept in a flat state so that a plurality of wire-like conductors are insulated from each other by a pair of films such as a flexible printed circuit (FPC) or a flexible flat cable (FFC), for example. In this case, the pair of films is the base member. It is also applicable that the electrical wire is embedded in a resin portion as a molded base member and kept in a flat form to constitute the wiring member. The wiring member needs not have a branch wire part.

The sheet material 24 includes a connection end portion 25. Herein, each of both end portions of the main wire part and the tip end portion of the branch wire part is the connection end portion 25. Herein, the connection end portion 25 is formed into an elongated shape.

In each connection end portion 25, the electrical wire 22 is held by the connection end portion 25 to be directed to the tip end portion of the connection end portion 25 along the extension direction of the connection end portion 25. That is to say, the electrical wire 22 is fixed to a portion of the connection end portion 25 in the sheet material 24 along the extension direction of the connection end portion 25. As described above, the electrical wire 22 may extend from the tip end portion of the connection end portion 25 to be connected to the connector 23, or may be connected to the connector without extending from the tip end portion of the connection end portion 25. FIG. 1 and FIG. 2 illustrate the former example. Described in any case is the example that the electrical wire 22 is connected to the connector 23 at the tip end portion of the connection end portion 25.

The tip end portion of the connection end portion 25 is formed in a catch suppressing shape portion 26 directed to the base end side of the connection end portion 25 toward an outer lateral side with an increasing distance from the electrical wire 22. More specifically, both side edges of the connection end portion 25 follow the extension direction of the electrical wire 22 in the connection end portion 25. The both side edges of the connection end portion 25 are parallel to each other. A tip end edge of the connection end portion 25 is perpendicular to the extension direction of the electrical wire 22 in the connection end portion 25. An extension direction of the tip end edge of the connection end portion 25 is perpendicular to the extension direction of the both side edges of the connection end portion 25. The tip end edge of the connection end portion 25 and the side edge of the connection end portion 25 are continuously formed via the catch suppressing shape portion 26 described above. The catch suppressing shape portion 26 is formed into a shape gradually directed to the base end side of the connection end portion toward an outer direction perpendicular to the electrical wire 22 (a direction farther away from the electrical wire 22 in the width direction of the connection end portion 25). The tip end of the connection end portion 25 is an end of a side of the connection end portion 25 where the end portion of the electrical wire 22 is disposed or the electrical wire 22 extends. The base end side of the connection end portion 25 is a side opposite to the tip end in the extension direction of the electrical wire 22 or a direction along the longitudinal direction of the connection end portion 25. Herein, the catch suppressing shape portion 26 is formed into a curved shape (a shape of a quarter of a circle herein) convexed outwardly in a plan view of the wiring member 20. In consideration of a thickness of the sheet material 24, the catch suppressing shape portion 26 is also considered to have a curved surface shape convexed to an outer side.

A width of the connection end portion 25 is appropriately set in accordance with the number of electrical wires 22 to be held, for example. A width of the connector 23 is appropriately set in accordance with the number of electrical wires 22 to be connected and a shape of a connector which is the other side of connection, for example. The width of the connection end portion 25 may be smaller or larger than that of the connector 23. FIG. 1 and FIG. 2 illustrate an example that the width of the connection end portion 25 is larger than that of the connector 23, that is to say, the width of the connector 23 is smaller than that of the connection end portion 25. That is to say, the both side portions of the connection end portion 25 protrude to an outer side of the connector 23 in the width direction in the width direction of the connector 23.

In this case, the catch suppressing shape portion 26 may be directed to the outer lateral side of the connection end portion 25 from a position of a side edge portion of the connector 23 or a position on an inner side of the side edge portion as an origin P in the width direction of the connector 23. FIG. 2 illustrates an auxiliary line L formed by extending the side edge portion of the connector 23 to a side of the connection end portion 25 along the extension direction of the electrical wire 22. The tip end edge of the connection end portion 25 is perpendicular to the electrical wire 22. A portion where the tip end edge of the connection end portion 25 is changed to the catch suppressing shape portion 26 is the origin P of the catch suppressing shape portion 26. The origin P is preferably located on the auxiliary line L described above or closer to a center of the connection end portion 25 in the width direction in relation to the auxiliary line L. FIG. 2 illustrates an example that the origin P is located closer to the center of the connection end portion 25 in the width direction in relation to the auxiliary line L.

Figure 3:
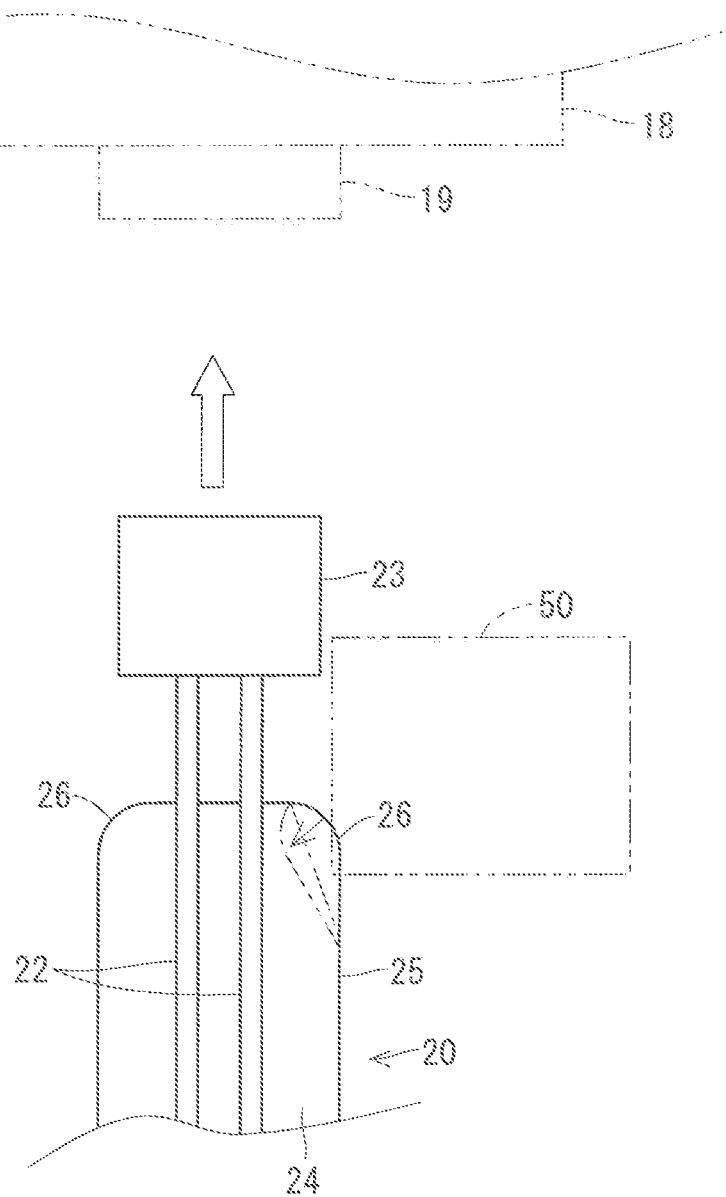
FIG. 3 is an explanation view illustrating an example of an operation of connecting a connector.

FIG. 3 is an explanation view illustrating an example of an operation of connecting the connector 23 corresponding to the connection end portion 25 to a connector 19 on a side of the electrical apparatus 18. In this case, the connector 23 is assumed to move from a position facing the connector 19 toward the connector 19 to be connected to the connector 19. An arrangement space of the wiring member 20 in the vehicle is assumed to include various members. Thus, when the connector 23 moves toward the connector 19, there is a possibility that at least one side portion on a tip end side of the connection end portion 25 has contact with the other member 50. In the present wiring member 20, the catch suppressing shape portion 26 is formed in the side portion on the tip end side of the connection end portion 25. Thus, even when the catch suppressing shape portion 26 has contact with the other member 50, the catch suppressing shape portion 26 is hardly caught by the other member 50. For example, in a case where the sheet material 24 as the base member is relatively soft, even when the catch suppressing shape portion 26 has contact with the other member 50, the connection end portion 25 is deformed to partially bow, and it is suppressed that the catch suppressing shape portion 26 is caught by the other member 50. Alternatively, for example, even in a case where the base member is hard to some degree, when the catch suppressing shape portion 26 has contact with the other member 50, the connection end portion 25 wholly moves in a direction farther away from the other member 50, and it is suppressed that the catch suppressing shape portion 26 is caught by the other member 50.

According to the wiring member 20 having such a configuration, formed in the tip end portion of the connection end portion 25 is the catch suppressing shape portion 26 directed to the base end side of the connection end portion 25 with the increasing distance from the electrical wire 22. Thus, even when the connection end portion 25 moves toward the other electrical apparatus 18 in a case where the end portion of the electrical wire 22 is connected to the other electrical apparatus 18, the tip end portion of the connection end portion 25 is hardly caught by the surrounding member 50, for example.

When the catch suppressing shape portion 26 has a curved surface shape convexed to the outer side, the catch suppressing shape portion 26 is further hardly caught by the surrounding member 50, for example.

When the electrical wire 22 is connected to the connector 23 at the tip end portion of the connection end portion 25, the connector 23 moves toward the connector 19 which is the other side of connection to be connected to the connector 19. In this case, the connection end portion 25 also moves toward the connector 19, thus a state where the tip end portion of the connection end portion 25 is easily caught by the surrounding member 50, for example, may occur. Thus, it is preferable that the catch suppressing shape portion 26 is formed in the tip end portion of the connection end portion 25 in the case where the electrical wire 22 is connected to the connector 23 at the tip end portion of the connection end portion 25.

When the width of the connector 23 is smaller than a maximum width of the connection end portion 25, the connection end portion 25 protrudes to the outer lateral side of the connector 23. When the connector 23 moves toward the connector 19 which is the other side of connection, the side portion of the connection end portion 25 protruding to the lateral side with respect to the connector 23 is caught by the surrounding member 50 easily. In such a case, the catch suppressing shape portion 26 is preferably formed in the tip end portion of the connection end portion 25. Herein, the maximum width indicates, in consideration of a case where the side edge portion of the connector 23 has a curved line or a stepped line, for example, a value in which a dimension in a direction perpendicular to the extension direction of the electrical wire 22 is maximum. It is also applicable that when both side edge portions of the connection end portion 25 (both side edge portions continuously formed on the base end side in relation to the catch suppressing shape portion 26) are parallel to each other, a width between the both side edge portions is a maximum width.

When the catch suppressing shape portion 26 is formed in the side edge portion of the connector 23 or on the inner side of the side edge portion as the origin P, the surrounding member 50 is expected to have contact with the catch suppressing shape portion 26 in the tip end portion of the connection end portion 25. Thus, the connection end portion is further hardly caught by the surrounding member 50.

Various modification examples are described based on a premise of the embodiment described above.

Figure 4:
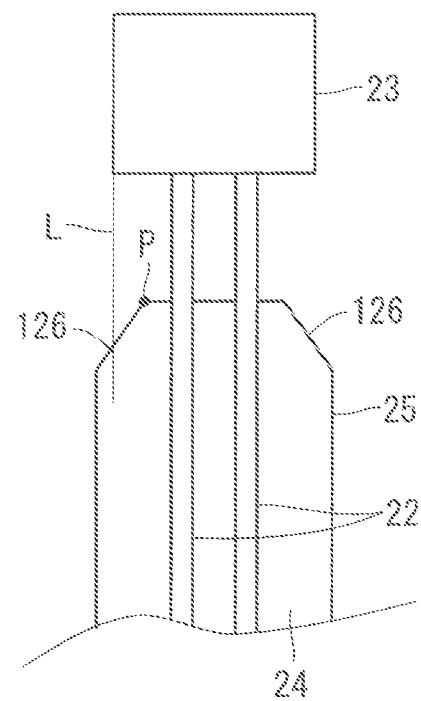
FIG. 4 is a partially-enlarged schematic plan view of a wiring member according to a first modification example.

In a first modification example illustrated in FIG. 4, a catch suppressing shape portion 126 corresponding to the catch suppressing shape portion 26 is formed into a shape in which a corner of the tip end portion of the connection end portion 25 is chamfered. That is to say, the catch suppressing shape portion 126 is formed into a shape extending in an oblique direction with respect to the tip end edge and the side edge portion of the connection end portion 25. Thus, the catch suppressing shape portion 126 is an example of a shape portion directed to the base end side of the connection end portion 25 with the increasing distance from the electrical wire 22.

Also according to the present example, even when the connection end portion 25 moves toward the other electrical apparatus 18 in the case where the end portion of the electrical wire 22 is connected to the other electrical apparatus 18, the tip end portion of the connection end portion 25 is hardly caught by the surrounding member 50, for example.

The catch suppressing shape portion 126 may be formed by obliquely removing the corner of the connection end portion 25, for example. In this case, the catch suppressing shape portion 126 is formed easily.

Figure 5:
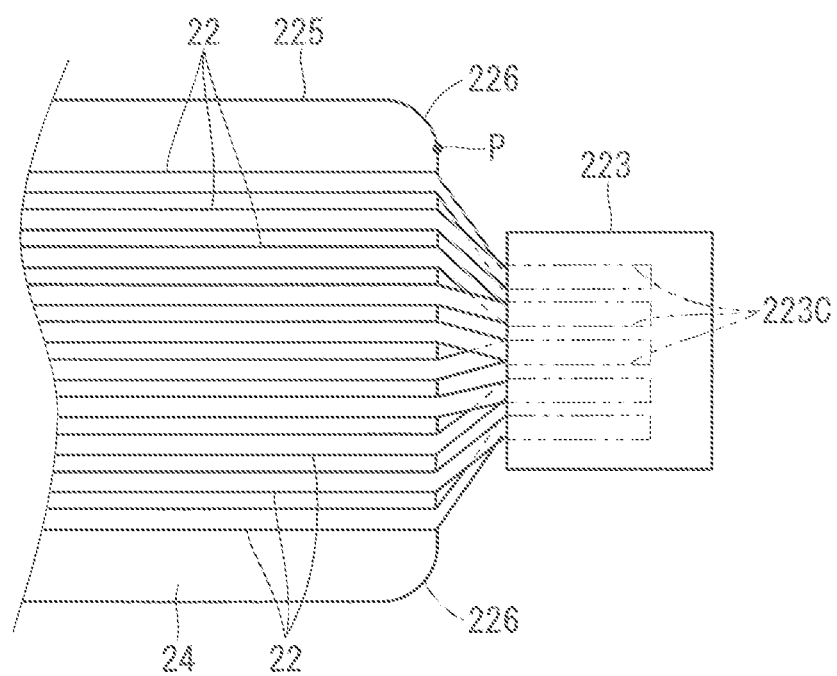
FIG. 5 is a partially-enlarged schematic plan view of a wiring member according to a second modification example.
Figure 6:
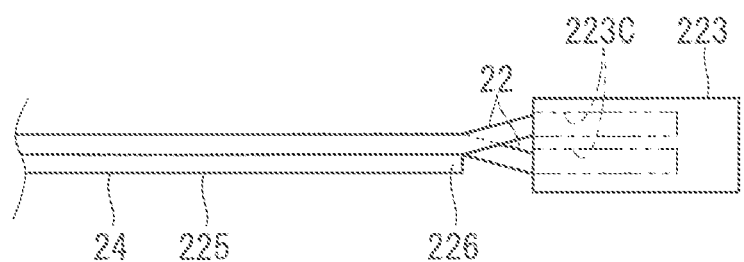
FIG. 6 is a partially-enlarged schematic side view of the wiring member according to the second modification example.

In a second modification example illustrated in FIG. 5 and FIG. 6, a connector corresponding to the connector 23 is a multiple stage connector 223. The multiple stage connector 223 is a connector in which cavities 223C housing terminals each connected the end portion of the electrical wire 22 are formed in multiple stages. FIG. 5 and FIG. 6 illustrate an example that a plurality of (five herein) cavities 223C are formed in the width direction and the multiple stage (two stages herein) cavities 223C are formed in the thickness direction.

In a connection end portion 225 corresponding to the connection end portion 25, the plurality of electrical wires 22 held by the connection end portion 225 are connected to the multiple stage connector 223 as follows. That is to say, the plurality of electrical wires 22 are held in a parallel state in the connection end portion 225. Herein, the plurality of electrical wires 22 are disposed on one main surface of the connection end portion 225 having a sheet-like shape to be arranged in a row in a width direction of the connection end portion 225. Thus, a width of the connection end portion 225 has a dimension corresponding to diameters and the number of the electrical wires 22 to be held, and has a dimension in which an interval between the electrical wires 22 and an extra length width on an outer side of the electrical wires 22 are added to the dimension.

In the multiple stage connector 223, the plurality of cavities 223C overlap with each other in a plan view. Thus, in the multiple stage connector 223, the number of cavities 223C arranged in the width direction is smaller than the number of electrical wires 22 arranged in the width direction of the connection end portion 225. For example, ten terminals of the electrical wires 22 arranged in the connection end portion 225 can be held in upper and lower stages of the five cavities 223C arranged in the width direction of the multiple stage connector 223. Thus, the width of the multiple stage connector 223 can be smaller than that of the connection end portion 225.

A catch suppressing shape portion 226 corresponding to the catch suppressing shape portion 26 described above is formed also in a tip end portion of the connection end portion 225. Herein, an origin P of the catch suppressing shape portion 226 is located on an outer side of a side edge portion of the multiple stage connector 223. As described in the embodiment, the origin P may be located in the same position as the side edge portion of the multiple stage connector 223 or on an inner side of the side edge portion of the multiple stage connector 223 in the width direction of the connection end portion 225.

As with the present second modification example, the width of the multiple stage connector 223 is relatively made small easily. Thus, the connection end portion 225 protrudes to an outer lateral side of the multiple stage connector 223 easily. In such a case, the catch suppressing shape portion 226 is provided in the connection end portion 225, thus it is efficiently suppressed that the connection end portion 225 is caught by the surrounding member 50.

The plurality of electrical wires 22 extending from the multiple stage connector 223 are held in a parallel state in the connection end portion 225. Thus, the connection end portion 225 has the large width and protrudes to the outer lateral side of the multiple stage connector 223 easily. In such a case, the catch suppressing shape portion 226 is provided in the connection end portion 225, thus it is efficiently suppressed that the connection end portion 225 is caught by the surrounding member 50.

The plurality of electrical wires extending from the multiple stage connector may be held in a parallel state over a plurality of layers in the connection end portion.

Each configuration described in the embodiments and each modification example described above can be appropriately combined as long as they are not contradictory. For example, a catch suppressing shape portion having a shape obliquely cut in the second modification example may be formed.

EXPLANATION OF REFERENCE SIGNS 12 plate-like portion
18 electrical apparatus
19 connector
20 wiring member
22 electrical wire
23 connector
24 sheet material
25 connection end portion
26 catch suppressing shape portion
50 surrounding member
126 catch suppressing shape portion
223 multiple stage connector
223C cavity
225 connection end portion
226 catch suppressing shape portion
L auxiliary line
P origin

The invention claimed is:

1. A wiring member, comprising:
   at least one wire-like transmission member; and
   a base member keeping the wire-like transmission member in a flat form, wherein
   the base member includes a connection end portion,
   the wire-like transmission member is held by the connection end portion to be directed to a tip end portion of the connection end portion along an extension direction of the connection end portion,
   the tip end portion of the connection end portion includes a catch suppressing shape portion directed to a base end side of the connection end portion with an increasing distance from the wire-like transmission member,
   the wire-like transmission member is connected to a connector at an endmost portion of the wire-like transmission member that extends from the tip end portion of the connection end portion along the extension direction of the connection end portion,
   a width of the connection end portion is larger than a width of the connector, and
   an origin of the catch suppressing shape portion is provided at a position closer to a center of the connection end portion, in a width direction of the connection end portion, than an intersecting point of an auxiliary line is to the center of the connection portion, the auxiliary line being formed by extending a side edge portion of the connector to intersect with the tip end portion of the connection end portion along an extension direction of the wire-like transmission member.

2. The wiring member according to claim 1, wherein the catch suppressing shape portion has a curved surface shape convexed to an outer side of the wiring member in a plan view.

3. The wiring member according to claim 1, wherein the catch suppressing shape portion is formed into a shape directed to the base end side of the connection end portion with an increasing distance from the wire-like transmission member from a position of a side edge portion of the connector or a position on an inner side of the side edge portion as the origin in the width direction of the connector.

4. The wiring member according to claim 1, wherein the connector is a multiple stage connector.

5. The wiring member according to claim 4, wherein the plurality of wire-like transmission members extending from the multiple stage connector are held by the connection end portion in a parallel state.

* * * * *